United States Patent
Abrami et al.

(10) Patent No.: US 8,802,750 B2
(45) Date of Patent: Aug. 12, 2014

(54) REDUCED DENSITY OPAQUE COATINGS AND AEROSPACE VEHICLES AT LEAST PARTIALLY COATED THEREWITH

(75) Inventors: Siamanto Abrami, Glendale, CA (US); Razmik Boghossian, Porter Ranch, CA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1690 days.

(21) Appl. No.: 11/970,116

(22) Filed: Jan. 7, 2008

(65) Prior Publication Data

US 2012/0141774 A1    Jun. 7, 2012

(51) Int. Cl.
    *C08K 9/02*    (2006.01)
    *C08K 7/24*    (2006.01)
    *C08K 3/22*    (2006.01)

(52) U.S. Cl.
    USPC ............................ 523/200; 523/218; 523/219

(58) Field of Classification Search
    USPC ........................ 523/200, 218, 219; 428/650
    See application file for complete search history.

(56) References Cited

U.S. PATENT DOCUMENTS

| 3,553,001 | A | | 1/1971 | Kohlschutter et al. ......... 117/100 |
| 3,835,087 | A | | 9/1974 | Searight et al. ........... 260/33.6 R |
| 4,898,894 | A | * | 2/1990 | Melber et al. .................... 521/54 |
| 5,667,917 | A | * | 9/1997 | Edwards et al. .............. 429/228 |
| 6,110,528 | A | * | 8/2000 | Kimura et al. ................ 427/218 |
| 6,184,332 | B1 | * | 2/2001 | Dos Santos ..................... 528/81 |
| 6,648,958 | B2 | * | 11/2003 | Anselmann et al. .......... 106/442 |

FOREIGN PATENT DOCUMENTS

GB        2 427 157 A    12/2006

* cited by examiner

*Primary Examiner* — Vickey Nerangis
(74) *Attorney, Agent, or Firm* — Lauren Schneider

(57) ABSTRACT

Disclosed are reduced density coating compositions and articles, such as aerospace vehicles, at least partially coated with an opaque coating deposited from such compositions. The reduced density coating compositions include low density microspheres comprising a core and a solid opacifying coating covering a surface of the core.

21 Claims, No Drawings

REDUCED DENSITY OPAQUE COATINGS AND AEROSPACE VEHICLES AT LEAST PARTIALLY COATED THEREWITH

FIELD OF THE INVENTION

The present invention is directed to reduced density coating compositions and articles, such as aerospace vehicles, at least partially coated with an opaque coating deposited from such compositions.

BACKGROUND OF THE INVENTION

Many articles are coated with one or more protective and/or decorative coatings for any of a variety of reasons. Aerospace vehicles, for example, constitute one exemplary category of such articles. Various types of coatings, such as primers and topcoats are commonly applied to various surfaces of an aerospace vehicle, such as an airplane or helicopter. These coatings perform a variety of protective and decorative functions. Typically, it is desirable that such coatings are opaque, that is, they are sufficiently non-transparent to hide the underlying surface from view.

Recently, manufacturers of aerospace vehicles, in an effort to increase the fuel economy and lifespan of their airplanes, have sought ways to reduce aircraft weight. As a matter of fact, it is believed that even a slight reduction in the weight of an aircraft, even as little at 10 pounds, may save up to hundreds of thousands of dollars over the lifespan of the aircraft.

As a result, it would be desirable to provide a coating composition suitable for producing a coating having reduced density, but without sacrificing opacity. The present invention has been developed in view of the foregoing desire.

SUMMARY OF THE INVENTION

In certain respects, the present invention is directed to coating compositions comprising: (a) a binder; (b) an opacifying pigment, and (c) low density microspheres comprising a core and a solid opacifying coating covering a surface of the core.

In other respects, the present invention is directed to methods for reducing the density at a given film thickness of an opaque coating, without significantly impacting opacity, the method comprising replacing a portion of an opacifying pigment in a coating composition from which the coating is deposited with low density microspheres comprising a core and a solid opacifying coating covering a surface of the core.

In still other respects, the present invention is directed to aerospace vehicles having a surface at least partially coated with an opaque coating deposited from a coating composition comprising: (a) a binder, (b) an opacifying pigment, and (b) low density microspheres comprising a core and a solid opacifying coating covering a surface of the core.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated, certain embodiments of the present invention are directed to coating compositions. The coating composition(s) of the present invention may be liquid compositions, such as water-based or solvent-based liquid compositions, or, alternatively, in solid particulate form, i.e., a powder coating.

As indicated, the coating compositions of the present invention include a binder. In certain embodiments, the binder is a polymeric composition. Binders that may be used in the compositions of the present invention include, for example, those that are conventionally used in automotive OEM coating compositions, automotive refinish coating compositions, industrial coating compositions, architectural coating compositions, electrocoating compositions, powder coating compositions, coil coating compositions, wood coating compositions, and aerospace coating compositions, among others.

Polymeric compositions that are suitable for use as the binder in the compositions described herein may be thermoplastic or thermosetting. As used herein, by "thermosetting" is meant a polymeric composition that "sets" irreversibly upon curing or crosslinking, wherein the polymer chains of the polymeric components are joined together by covalent bonds. This property is usually associated with a cross-linking reaction of the composition constituents often induced, for example, by heat or radiation. See Hawley, Gessner G., The Condensed Chemical Dictionary, Ninth Edition, page 856; Surface Coatings, vol. 2, Oil and Colour Chemists' Association, Australia, TAPE Educational Books (1974). Curing or crosslinking reactions also may be carried out under ambient conditions. Once cured or crosslinked, a thermosetting resin will not melt upon the application of heat and is insoluble in solvents. By contrast, "thermoplastic" polymeric compositions comprise polymeric components that are not joined by covalent bonds and thereby can undergo liquid flow upon heating and are soluble in solvents. See Saunders, K. J., Organic Polymer Chemistry, pp. 41-42, Chapman and Hall, London (1973).

The thermosetting coating compositions typically comprise a crosslinking agent that may be selected from, for example, aminoplasts, polyisocyanates including blocked isocyanates, polyepoxides, beta-hydroxyalkylamides, polyacids, anhydrides, polyaziridenes, organometallic acid-functional materials, polyamines, polyamides, carbodiamides, and mixtures of any of the foregoing.

In addition to or in lieu of the above-described crosslinking agents, the coating composition typically comprises at least one film-forming resin. Thermosetting or curable coating compositions typically comprise film forming polymers having functional groups that are reactive with the crosslinking agent. The film-forming resin in the coating composition may be selected from any of a variety of polymers well-known in the art. The film-forming resin can be selected from, for example, acrylic polymers, polyester polymers, polyurethane polymers, polyamide polymers, polyether polymers, polysiloxane polymers, fluoropolymers, copolymers thereof, and mixtures thereof. Generally these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups) mercaptan groups, and combinations thereof.

In certain embodiments, the coating compositions of the present invention comprise a binder comprising (a) a curable resinous polyepoxide, and (b) a polyamine and/or polyamide. In certain embodiments, the coating compositions of the present invention comprise a binder comprising (a) a hydroxyl functional film-forming resin, and (b) an isocyanate functional compound. Such compositions are often embodied as multi-component coating compositions wherein, in the first case, the polyepoxide is stored separately from the polyamine and/or polyamide, and, in the second case, the hydroxyl functional resin is stored separately from the isocyanate functional compound. In these embodiments, the two components are combined just prior to application of the composition to a substrate. In these embodiments of the present invention, the opacifying pigment and the low density microspheres may be present in one or both of the components and may be present together in the same component or one may be present in one component and the other in the other component. In certain embodiments, both the opacifying pigment and the low density microspheres are present with the polyamine and/or polyamide in the first case and with the hydroxyl functional film-forming resin in the second case.

Appropriate mixtures of film-forming resins may also be used in the preparation of the coating compositions of the present invention.

In accordance with certain embodiments of the present invention, the binder is present in the composition in an amount of 30 to 98 percent by weight, or, in some cases, 60 to 98 percent by weight, or 75 to 98 percent by weight based on the total weight of the composition. The amount of binder present in these embodiments of the coating compositions of the present invention may range between any combination of these values, inclusive of the recited values.

The coating compositions of the present invention comprise an opacifying pigment. As used herein, the term "opacifying pigment" refers to a pigment that is included in a coating composition to improve the hiding ability of a coating deposited therefrom. More particularly, in certain embodiments, the opacifying pigment comprises solid particles having a refractive index such that the difference in refractive index between the opacifying pigment and the binder is at least about 0.5 or, in some cases, at least about 1.0 at the wavelength where the minimum difference in refractive index between the opacifying pigment and the binder is observed. Exemplary, but non-limiting, opacifying pigments that are suitable for use in the present invention are solid titanium dioxide, zinc oxide, and/or lead oxide particles. In certain embodiments, the opacifying pigment has an optimal particle diameter of around 200 nanometers and, as previously indicated, a refractive index that is significantly higher than that of the binder in which the material is dispersed.

As indicated, in certain embodiments, the opacifying pigment is in the form of a solid powder. In certain embodiments, the opacifying pigment comprises titanium dioxide solid powder that, in certain embodiments, has a density of at least about 4 grams/cm$^3$.

In accordance with certain embodiments of the present invention, the opacifying pigment is present in an amount of 1 to 65 percent by weight, or, in some cases, 3 to 40 percent by weight, or 5 to 35 percent by weight based on the total weight of the composition. The amount of opacifying pigment present in these embodiments of the coating compositions of the present invention may range between any combination of these values, inclusive of the recited values.

The coating compositions of the present invention also comprise low density microspheres comprising a core and a surface, wherein a solid opacifying coating covers at least a portion of the surface. As used herein, the term "microsphere" is used as a synonym for microcapsule, microparticle, microballoon, and microsphere particles. As used herein, the term "low density microsphere" refers to microspheres having a density of no more than 50%, in some case no more than 25%, of the density of the opacifying pigments present in the composition. In certain embodiments, the coating compositions of the present invention comprise low density microspheres having a density of no more than about 2 gram/cm$^3$, such as no more than 0.9 gram/cm$^3$, in some cases 0.05 to 1.0 gram/cm$^3$, in other cases 0.2 to 2.0 gram/cm$^3$, or, in yet other cases 0.3 to 1.5 gram/cm$^3$.

As used herein, the term "core" refers to the central or innermost part of the microspheres. In certain embodiments of the present invention, the core is a hollow core. In certain embodiments, the core has a diameter that is less than 1000, 500, 100, 50, or 10 micrometers. In certain embodiments, the core has a diameter greater than 1, 5, 10 or 15 micrometers. In certain embodiments, the core has a diameter of 5 to 20 micrometers. In certain embodiments, the core is roughly spherical.

As used herein, the term "surface" refers to the outer or topmost boundary of the microsphere. The surface of the microspheres of the present invention may be constructed of any of a variety of materials including, for example, inorganic materials, such as alumina, silica, aluminum silicate, calcium carbonate, and/or calcium silicate, among others, or organic materials, such as polystyrene, polyethylene, polyacrylate, and/or polyolefins, among others.

Specific examples of microspheres suitable for use in the present invention include microspheres of polyacrylates and polyolefins, and silica microspheres having particle sizes ranging from 5 to 100 microns and a specific gravity of 0.25 (ECCOSPHERES®, W. R. Grace & Co.). Other examples include alumina/silica microspheres having particle sizes in the range of 5 to 300 microns and a specific gravity of 0.7 (FILLITE®, Pluess-Stauffer International), aluminum silicate microspheres having a specific gravity of from about 0.45 to about 0.7 (Z-LIGHT®), and calcium carbonate-coated polyvinylidene copolymer microspheres having a specific gravity of 0.13 (DUALITE 6001AE®, Pierce & Stevens Corp.). Other suitable microspheres for use in this invention often have a specific gravity ranging from 1.0 to 2.2 and are exemplified by calcium silicates, fumed silica, precipitated silica, and polyethylene. Examples include calcium silicate having a specific gravity of from 2.1 to 2.2 and a particle size of from 3 to 4 microns (HUBERSORB HS-600®, J. M. Huber Corp.) and fumed silica having a specific gravity of 1.7 to 1.8 with a particle size less than 1 (CAB-O-SIL TS-720®, Cabot Corp.). Other examples include precipitated silica having a specific gravity of from 2 to 2.1 (HI-SIL TS-7000®, PPG Industries), and polyethylene having a specific gravity of from 1 to 1.1 and a particle size of from 10 to 20 microns (SHAMROCK S-395®, Shamrock Technologies Inc.).

As indicated, the low density microspheres present in the coating compositions of the present invention comprise a solid opacifying coating covering at least a portion of the surface thereof. As used herein, the term "opacifying coating" refers to a coating comprising a material with hiding capability. In certain embodiments, therefore, the difference in refractive index between the opacifying coating and the binder is at least about 0.5 or, in some cases, at least about 1.0 at the wavelength where the minimum difference in refractive index between the opacifying coating and the binder is observed. Exemplary, but non-limiting, materials of which the opacifying coating may be constructed are titanium dioxide, zinc oxide, and/or lead oxide. In certain embodiments, the solid opacifying coating comprises the same material, such as titanium dioxide, as the opacifying pigment described above.

As used herein, the term "solid opacifying coating" refers to an opacifying coating that is in a solid state at the temperature and pressure at which the low density microspheres are used. In certain embodiments, the solid opacifying coating is solid at 25° C. and at a pressure of 100 kPa.

As indicated, the solid opacifying coating covers at least a portion of the surface of the microsphere. In certain embodiments, the solid opacifying coating is a substantially continuous coating covering from 70 to 100, 80 to 100, 90 to 100, or 100 percent of the entire surface area of the microsphere. In certain embodiments, the solid opacifying coating has a film thickness of less than 25, 20, 15, 5, or 2 micrometers, such as 0.1 to 2 micrometers. In certain embodiments, the solid opacifying coating has a film thickness of no more than 100 nanometers, in some cases from 0.2 to 100 nanometers.

Any suitable technique known to those skilled in the art may be used to deposit the solid opacifying coating to the surface of the microsphere. Suitable techniques include, for example, the techniques described in U.S. Pat. No. 6,110,528 and UK Patent Application GB 2 427 157 A. For example, such a coating may be applied by chemical precipitation. In such a method, a chemical precursor or mixture of chemical precursors of the solid opacifying coating are hydrolyzed and pass sequentially through a solution state and gel states before being dehydrated. When the solid opacifying coating comprises titanium dioxide, for example, a suitable precursor is an alkoxytitanate, such as tetraethoxyorthotitanate.

In certain embodiments, the coating of the microsphere with the solid opacifying coating is carried out by adding a suitable precursor to a mixture of microspheres and a hardener in a solvent system. Exemplary hardeners include, for examples, ammonia, hydrochloric acid, acetic acid, ammonium carbonate, triethanolamine, calcium hydroxide, magnesium oxide, dicyclohexylamine, ammonium acetate, tributyltin, and mixtures thereof, among others. The solvent, in certain embodiments, comprises a water miscible organic solvent, such as isopropanol, methanol, ethanol, butanol, or mixtures thereof, among others. The solvent system may also comprise water.

In certain embodiments, the precipitation reaction is carried out at a temperature in the range from 30 to 50° C. under stirring at a rate suitable to keep the microspheres well dispersed. The precursor may be added continuously or batchwise.

After deposition of the coating, the coated microspheres may be aged for a period of time with the application of heat. The aging step may take place over, for example, 2 to 24 hours, such as 6, 8, 10, 12 or 15 hours at a temperature of 40 to 800° C., such as 120 to 150° C. The aging step may, if desired, be carried out under vacuum. Finally, a wash step may follow the aging step.

Exemplary low density coated microspheres suitable for use in the present invention are described in UK Patent Application GB 2 427 157 A, incorporated herein by reference.

In accordance with certain embodiments of the present invention, the low density microspheres described above are present in the composition in an amount such that the weight ratio of such microspheres to the opacifying pigment is from 1:9 to 9:1, such as 1:4 to 4:1, or, in some cases, 1:3 to 3:1, or, in yet other cases 1:2 to 2:1. In certain embodiments, the low density microspheres described above are present in the composition in an amount such that the weight ratio of such microspheres to the opacifying pigment is at least 1:7, such as at least 1:4. The weight ratio of low density microspheres to opacifying pigment in these embodiments of the coating compositions of the present invention may range between any combination of these values, inclusive of the recited values.

It has been surprisingly discovered that, in at least some cases, the coating compositions of the present invention are capable of producing an opaque coating when deposited at the same film thickness as a similar coating without the low density microspheres. By "similar coating" is meant a coating deposited from a coating composition having the same composition as the composition to which it is being compared, but without the presence of the low density microspheres described herein wherein the low density microspheres are replaced by opacifying pigment. Moreover, it has been discovered that the dry film density of a coating deposited from a coating composition of the present invention can, in at least some cases, be 15 or more percent, such as 20 or more percent, or, in some cases 50 or more percent, lower than such a similar coating without the low density microspheres at the same film thickness.

As used herein, the term "opaque coating" refers to a non-transparent coating. In other words, the surface beneath the coating is not visible to the naked eye. In certain embodiments, the "opaque coatings" of the present invention have an opacity of at least 95 percent, when measured according to ASTM Method # E1349.

If desired, the coating composition can comprise other optional materials well known in the art of formulated surface coatings, such as plasticizers, anti-oxidants, hindered amine light stabilizers, UV light absorbers and stabilizers, surfactants, flow control agents, fillers, organic cosolvents, catalysts, including phosphonic acids and other customary auxiliaries. Examples of fillers include, but are not limited to, silica, e.g., precipitated silicas, clay, aluminum hydroxide, and barium sulfate.

In certain embodiments, the coating compositions of the present invention comprise a colorant, which may be different from the previously described coating components. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the compositions of the present invention include pigments and/or compositions that produce one or more appearance effects such as reflectance, pearlescence, metallic sheen, phosphorescence, fluorescence, photochromism, photosensitivity, thermochromism, goniochromism and/or colorchange. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions of the present invention can be prepared by any suitable method, such as ultrasonic mixing, well known to those skilled in the art. For example, the components discussed can be diluted with water and/or organic solvent to have the desired weight percent solids and mixed together.

Powder coating compositions of the present invention can be prepared by standard methods known in the art. For example, the components are first thoroughly mixed to ensure spatial homogeneity of the ingredients. The composition is then intimately melt kneaded in an extruder. Typical zone temperatures during extrusion range from 40° C. to 125° C., such as 45° C. to 100° C. The exiting extrudate is rapidly cooled to terminate polymerization. The resulting chip is then micronized into powder with an average particle size of 0.1 to 200 microns, such as 1 to 100 microns. Comminution methods are well known. Comminution can be accomplished, for example, by air-classifying mills, impact mills, ball mills, or other fracture-induced mechanisms. Post additives that improve fluidization of the powder mass and/or improve the resistance to impact fusion may be incorporated into the final product before or after micronization.

The compositions of the present invention can be applied to any of a variety of substrates. Common substrates to which the coating compositions of the present invention are applied can include titanium, stainless steel, aluminum, anodized, primed, organic coated and chromate coated forms thereof, epoxy, urethane, graphite, fiberglass composite, KEVLAR®, acrylics and polycarbonates.

The coating compositions of the present invention may be used as a single coating, as a base coating in a two-layered system, as layers of a multi-layered system including a clear top coating composition, colorant layer and base coating composition, or as a primer layer. The coating compositions of the present invention can be applied directly onto the surface of a substrate or over an underlayer by any suitable coating process known to those of ordinary skill in the art, for example, by dip coating, direct roll coating, reverse roll coating, curtain coating, spray coating, brush coating, vacuum coating and combinations thereof. The method and apparatus for applying the composition to the substrate may be determined, at least in part, by the configuration and type of substrate material. In certain embodiments, the coating compositions of the present invention are applied in a single sweep or in several passes to provide a film having a thickness after cure of from 1 to 10 mils (25 to 250 microns), such as 2 to 4 mils (50 to 100 microns) when being employed, for example, as a topcoat or a basecoat layer, or 0.1 to 1 mils (2.5 to 25 microns), such as 0.2 to 0.8 (5 to 20 microns), when being employed as a primer layer.

The coating compositions of the present invention are cured at conditions that will be easily determined by those skilled in the art depending on the particulars of the composition.

As previously indicated, a surprising discovery was that the density of a coating composition could be significantly reduced, by 15 or more percent in some cases, without significantly impacting upon the opacity of a coating deposited from the coating composition, by partially replacing the opacifying pigment in the coating composition with the lightweight microspheres described herein. By "without significantly impacting" is meant that the deposited coating remains opaque when deposited at the same film thickness as the coating to which it is being compared. In some cases, the percent opacity does not change when measured according to ASTM Method # E1349. Conversely, it was discovered that the opacity of the coating is significantly impacted if the opacifying pigment is completely replaced with the lightweight microspheres described herein.

As should be apparent, therefore, the present invention is also directed methods for reducing the density at a given film thickness of an opaque coating, without significantly impacting the opacity of the coating. These methods comprising replacing a portion of an opacifying pigment in a coating composition from which the coating is deposited with low density microspheres comprising a core and a solid opacifying coating covering a surface of the core.

In still other respects, the present invention is directed to articles, such as aerospace vehicles, i.e., airplanes, including, but not limited to, large commercial and freight airplanes, helicopters, rockets, and other spacecraft. These articles have a surface at least partially coated with an opaque coating deposited from a coating composition comprising: (a) a binder, (b) an opacifying pigment, and (b) low density microspheres comprising a core and a solid opacifying coating covering a surface of the core.

Illustrating the invention are the following examples, which, however, are not to be considered as limiting the invention to their details. Unless otherwise indicated, all parts and percentages in the following examples, as well as throughout the specification, are by weight.

EXAMPLES

Example 1

Coating compositions were prepared using the ingredients and amounts (in grams) identified in Table 1.

TABLE 1

| No. | Material Description | Example 1a | Example 1b | Example 1c |
|---|---|---|---|---|
| | Base Component | | | |
| 1 | K-Flex[1] | 34.44 | 34.44 | 34.44 |
| 2 | TiO$_2$ Coated Low Density Microspheres[2] | 5.9 | 0 | 29.45 |
| 3 | Ti-Pure R-706-11[3] | 23.55 | 29.45 | 0 |
| 4 | Methyl Amyl Ketone | 17.03 | 17.03 | 17.03 |
| 5 | Xylene | 1.42 | 1.42 | 1.42 |

TABLE 1-continued

| No. | Material Description | Example 1a | Example 1b | Example 1c |
|---|---|---|---|---|
| | Activator Component | | | |
| 6 | Desmodur N 3390[4] | 39 | 39 | 39 |
| | Thinner Component | | | |
| 7 | Methyl Isobutyl Ketone | 10.64 | 10.64 | 10.64 |
| 8 | Butyl acetate | 12.85 | 12.85 | 12.85 |
| 9 | Ethyl-3-Ethoxy Propionate | 6.71 | 6.71 | 6.71 |
| 10 | Dibutyl tin dilaurate | 0.1 | 0.1 | 0.1 |
| 11 | 2,4-Pentanedione | 1.59 | 1.59 | 1.59 |

[1]Polyol commercially available from King Industries.
[2]Hollow glass microspheres coated with TiO$_2$ believed to be as described in UK Patent Application 2 427 157 A and available from Microsphere Tech., Ltd., Edinburgh, Scotland.
[3]Rutile titanium dioxide pigment commercially available from Du Pont de Nemours Co.
[4]Aliphatic polyisocyanate commercially available from Bayer Materials Science AG.

The coating compositions were prepared by adding materials 1, 4 and 5 of the base component together under agitations and nitrogen atmosphere. Materials 2 and/or 3 were then added individually and stirred until a Hegman of 7 was achieved to form the Base Component. The Base Component was then be mixed with the Activator Component and reduced with the Thinner Component and spray applied with a HPLV spray gun over bare aluminum and cured at room temperature for 2 hours before testing. The film thickness was about 1.65 mils.

Testing

The film density and the opacity of the cured coating was determined. Results are set forth in Table 2.

TABLE 2

| Example | Film Density[1] | Opacity[2] |
|---|---|---|
| 1a | 0.00650 | 95% |
| 1b | 0.008 | 95% |
| 1c | 0.0042 | 60% |

[1]Reported in lbs/ft$^2$ at 1 mil dry film thickness.
[2]Measured according to ASTM method # E1349.

Example 2

Coating compositions can be prepared using the ingredients and amounts (in grams) identified in Table 3.

TABLE 3

| No. | Material Description | Example 2a | Example 2b | Example 2c | Example 2d |
|---|---|---|---|---|---|
| | Base Component | | | | |
| 1 | Ancamide 2445[1] | 11.9 | 11.9 | 11.9 | 11.9 |
| 2 | Ancamine 2432[2] | 7.36 | 7.36 | 7.36 | 7.36 |
| 3 | Ancamine K-54[3] | 0.67 | 0.67 | 0.67 | 0.67 |
| 4 | Butanol | 20.37 | 20.32 | 20.32 | 20.32 |
| 5 | Xylene | 3.52 | 3.52 | 3.52 | 3.52 |
| 6 | Ti-Pure R-706-11[4] | 22.85 | 20 | 17 | 0 |
| 7 | TiO$_2$ Coated Low Density Microspheres[5] | — | 2.85 | 5.89 | 22.85 |
| 8 | Raven 14[6] | 0.028 | 0.05 | 0.05 | 0.028 |
| 9 | Barium sulfate | 32.68 | 32.68 | 32.68 | 32.68 |
| 10 | Silica | 1.4 | 1.4 | 1.4 | 1.4 |

TABLE 3-continued

| Material No. | Description | Example 2a | Example 2b | Example 2c | Example 2d |
|---|---|---|---|---|---|
| | Activator Component | | | | |
| 11 | Silquest A-187[7] | 1.089 | 1.089 | 1.089 | 1.089 |
| 12 | Bentone SD-2[8] | 1.089 | 1.089 | 1.089 | 1.089 |
| 13 | Xylene | 8.165 | 8.165 | 8.165 | 8.165 |
| 14 | Epon 828[9] | 47.03 | 47.03 | 47.03 | 47.03 |
| 15 | Methyl Amyl Ketone | 7.73 | 7.73 | 7.73 | 7.73 |
| 16 | Acetone | 34.9 | 34.9 | 34.9 | 34.9 |

[1] A low-viscosity polyamide commercially available from Air Products and Chemicals, Inc.
[2] A modified aliphatic amine curing agent (typical viscosity: 300 cps @ 770° F.), commercially available from Air Products and Chemicals, Inc.
[3] A Lewis Base catalyst, a tris(dimethylaminomethyl) phenol, commercially available from Air Products and Chemicals, Inc.
[4] Rutile titanium dioxide pigment commercially available from Du Pont de Nemours Co.
[5] Carbon black commercially available from Columbian Chemicals.
[6] Hollow glass microspheres coated with $TiO_2$ that can be prepared as described in UK Patent Application 2 427 157 A and available from Microsphere Tech., Ltd., Edinburgh, Scotland.
[7] γ-Glycidoxypropyltrimethoxy Silane commercially available from Momentive Performance Materials Inc.
[8] Rheological additive commercially available from Elementis Specialties, Inc.
[9] Bisphenol A epichlorohydrin based epoxy resin commercially available from Hexion Specialty Chemicals, Inc.

Such coating compositions can be prepared by adding materials 1 to 5 of the base component together under agitations and nitrogen atmosphere. Materials 6 to 10 can then be added individually and stirred until a Hegman of 6.5 is achieved to form the Base Component. The Base Component and then be mixed with the Activator Component and spray applied with a HPLV spray gun over bare aluminum and cured at room temperature for 2 hours before testing. A typical film thickness can be 0.5 mils.

Testing

A film density and opacity of a cured coating formed as described above was estimated. Estimated results are set forth in Table 4.

TABLE 4

| Example | Film Density[1] | Opacity[2] |
|---|---|---|
| 2a | 0.01069 | 94% |
| 2b | 0.01056 | 99% |
| 2c | 0.01075 | 99% |
| 2d | 0.005 | 60% |

[1] Reported in $lbs/ft^2$ at 1 mil dry film thickness.
[2] Measured according to ASTM method # E1349.

Whereas particular embodiments of this invention have been described above for purposes of illustration, it will be evident to those skilled in the art that numerous variations of the details of the present invention may be made without departing from the invention as defined in the appended claims.

We claim:

1. A coating composition comprising:
    (a) a binder;
    (b) an opacifying pigment, and
    (c) low density microspheres comprising a core and a solid opacifying coating directly covering the surface of the core, the surface of the core comprising aluminum silicate, calcium carbonate and/or calcium silicate.

2. The coating composition of claim 1, wherein the binder comprises a polymeric composition comprising a thermoplastic composition and/or a thermosetting composition.

3. The coating composition of claim 2, wherein the polymeric composition comprises:
    (a) a curable resinous polyepoxide; and
    (b) a polyamine and/or polyamide.

4. The coating composition of claim 2, wherein the polymeric composition comprises:
    (a) a hydroxyl functional film-forming resin, and
    (b) an isocyanate functional compound.

5. The coating composition of claim 1, wherein the opacifying pigment comprises titanium dioxide solid powder that has a density of at least about 4 grams/$cm^3$.

6. The coating composition of claim 1, wherein the low density microspheres have a density of no more than 25% of the density of the opacifying pigment.

7. The coating composition of claim 1, wherein the low density microspheres have a density of no more than about 1 gram/$cm^3$.

8. The coating composition of claim 1, wherein the solid opacifying coating covering has a film thickness of 0.2 to 100 nanometers.

9. The coating composition of claim 1, wherein the opacifying pigment and the low density microspheres are present in the composition in an amount such that the weight ratio of the low density microspheres to the opacifying pigment is 1:9 to 9:1.

10. The coating composition of claim 9, wherein the opacifying pigment and the low density microspheres are present in the composition in an amount such that the weight ratio of the low density microspheres to the opacifying pigment is at least 1:7.

11. The coating composition of claim 1, wherein the coating composition is capable of producing an opaque coating when deposited at the same film thickness as a similar coating without the low density microspheres.

12. The coating composition of claim 1, wherein the dry film density of a coating deposited from the coating composition is at least 15 percent lower than a similar coating without the low density microspheres at the same film thickness.

13. A coating composition comprising:
    (a) a binder;
    (b) an opacifying pigment, and
    (c) low density microspheres comprising a core and a solid opacifying coating directly covering at least a portion of the surface of the core, the surface of the core comprising aluminum silicate, calcium carbonate and/or calcium silicate,
    wherein the solid opacifying coating covering at least a portion of the surface of the core comprises titanium dioxide.

14. A coating composition comprising:
    (a) a binder;
    (b) an opacifying pigment, and
    (c) low density microspheres comprising a core and a solid opacifying coating directly covering at least a portion of the surface of the core, the surface of the core comprising aluminum silicate, calcium carbonate and/or calcium silicate,
    wherein the solid opacifying coating covering at least a portion of the surface of the core covers from 70 to 100 percent of the entire surface area of the microsphere.

15. An aluminum substrate at least partially coated with a coating deposited from the coating composition of claim 1.

16. An aerospace vehicle comprising the aluminum substrate of claim 15.

17. A coating composition comprising:
(a) a binder; and
(b) low density microspheres comprising a hollow core and a solid opacifying coating directly covering a surface of the hollow core, the surface of the hollow core consisting of alumina, silica, aluminum silicate, calcium carbonate and/or calcium silicate.

18. The coating composition of claim 17, wherein the surface of the hollow core consists of silica.

19. An aerospace vehicle comprising a surface at least partially coated with an opaque coating deposited from a coating composition comprising:
(a) a binder, and
(b) low density microspheres comprising a hollow core and a solid opacifying coating directly covering a surface of the hollow core, the surface of the hollow core consisting of silica, alumina, aluminum silicate, calcium carbonate and/or calcium silicate.

20. The aerospace vehicle of claim 19, wherein the coating composition further comprises an opacifying pigment and the opacifying pigment and the low density microspheres are present in the composition in an amount such that the weight ratio of the low density microspheres to the opacifying pigment is from 1:9 to 9:1.

21. A method for reducing the density at a given film thickness of an opaque coating, without significantly impacting the opacity of the coating, comprising replacing a portion of an opacifying pigment in a coating composition from which the coating is deposited with low density microspheres comprising a hollow core and a solid opacifying coating covering a surface of the hollow core, the surface of the hollow core consisting of alumina, silica, aluminum silicate, calcium carbonate and/or calcium silicate.

* * * * *